United States Patent
Lee et al.

(10) Patent No.: US 10,741,874 B2
(45) Date of Patent: Aug. 11, 2020

(54) COMPOSITION FOR GEL POLYMER ELECTROLYTE AND LITHIUM SECONDARY BATTERY INCLUDING THE SAME

(71) Applicant: LG Chem, Ltd., Seoul (KR)

(72) Inventors: Jung Hoon Lee, Daejeon (KR); Kyoung Ho Ahn, Daejeon (KR); Chul Haeng Lee, Daejeon (KR); Jeong Woo Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/316,540

(22) PCT Filed: Jan. 12, 2018

(86) PCT No.: PCT/KR2018/000647
§ 371 (c)(1),
(2) Date: Jan. 9, 2019

(87) PCT Pub. No.: WO2018/131953
PCT Pub. Date: Jul. 19, 2018

(65) Prior Publication Data
US 2019/0267660 A1  Aug. 29, 2019

(30) Foreign Application Priority Data

Jan. 12, 2017 (KR) .......... 10-2017-0005599
Jan. 12, 2018 (KR) .......... 10-2018-0004665

(51) Int. Cl.
*H01M 6/14* (2006.01)
*H01M 10/052* (2010.01)
(Continued)

(52) U.S. Cl.
CPC ......... *H01M 10/052* (2013.01); *C08F 222/10* (2013.01); *C08F 299/024* (2013.01);
(Continued)

(58) Field of Classification Search
CPC ........... H01M 10/052; H01M 10/0565; H01M 2300/0085
See application file for complete search history.

(56) References Cited

U.S. PATENT DOCUMENTS

2015/0364794 A1  12/2015  Nakazawa et al.
2017/0229735 A1  8/2017  Ahn et al.

FOREIGN PATENT DOCUMENTS

EP    3203565 A1    8/2017
JP    2004342537 A  12/2004
(Continued)

OTHER PUBLICATIONS

Search report from International Application No. PCT/KR2018/000647, dated Apr. 20, 2018.
(Continued)

*Primary Examiner* — Jane J Rhee
(74) *Attorney, Agent, or Firm* — Lerner, David, Littenberg, Krumholz & Mentlik, LLP

(57) ABSTRACT

The present invention relates to a composition for a gel polymer electrolyte, a gel polymer electrolyte prepared by polymerizing the same, and a lithium secondary battery including the gel polymer electrolyte, and particularly, to a composition for a gel polymer electrolyte having improved high-temperature safety, a gel polymer electrolyte formed by polymerizing the composition in an inert atmosphere, and a lithium secondary battery including the gel polymer electrolyte.

10 Claims, 1 Drawing Sheet

(51) Int. Cl.

| | |
|---|---|
| *C08G 65/48* | (2006.01) |
| *C08J 3/075* | (2006.01) |
| *H01M 10/0565* | (2010.01) |
| *C08G 65/333* | (2006.01) |
| *C08F 222/10* | (2006.01) |
| *C08F 299/02* | (2006.01) |
| *C08G 65/00* | (2006.01) |

(52) U.S. Cl.
CPC ..... *C08G 65/007* (2013.01); *C08G 65/33317* (2013.01); *C08G 65/485* (2013.01); *C08J 3/075* (2013.01); *H01M 10/0565* (2013.01); *H01M 2300/0085* (2013.01)

(56) References Cited

FOREIGN PATENT DOCUMENTS

| KR | 20050083532 A | 8/2005 |
|---|---|---|
| KR | 20110010516 A | 2/2011 |
| KR | 20150125928 A | 11/2015 |
| KR | 20160040127 A | 4/2016 |
| KR | 20160040128 A | 4/2016 |
| WO | 2016161465 A1 | 10/2016 |

OTHER PUBLICATIONS

Wong, H. C., Thesis: "Perfluorolpolyether-Based Electrolytes for Lithium Battery Applications." Department of Chemistry, University of North Carolina at Chapel Hill, 2015, pp. 100-111, Figures 4.9.

Gong, Xianjing, et al, "Facile One Pot Polycondensation Method to Synthesize the Crosslinked Polyethylenen glycol-Based Copolymer Electrolytes." Macromoleculiarl Chemistry and Physics, vol. 217, Received: Jan. 29, 2016; Revised: Apr. 20, 2016; Published online: May 17, 2016, pp. 1607-1613.

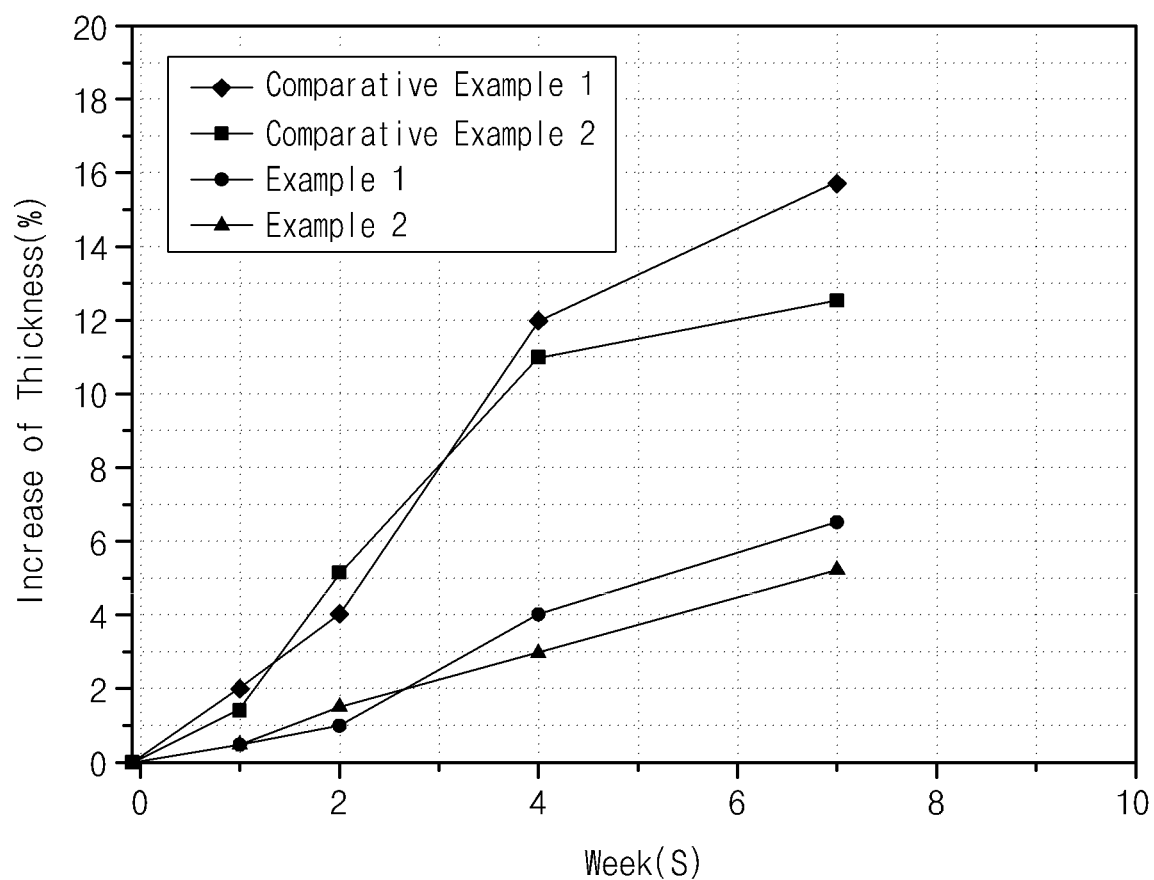

COMPOSITION FOR GEL POLYMER ELECTROLYTE AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2018/000647, filed Jan. 12, 2018, which claims priority to Korean Patent Application No. 10-2017-0005599, filed Jan. 12, 2017 and Korean Patent Application No. 10-2018-0004665, filed Jan. 12, 2018, the disclosures of which are incorporated herein by reference.

TECHNICAL FIELD

The present invention relates to a composition for a gel polymer electrolyte having improved high-temperature safety, and a lithium secondary battery including the same.

BACKGROUND ART

Recently, interests in energy storage technologies have been increasingly grown. In particular, while the application of the energy storage technologies is expanded to mobile phones, camcorders, notebook PCs, and even to electric vehicles, research and efforts for the development of the energy storage technologies have been gradually materialized.

Electrochemical devices have received most attention in the field of energy storage technologies, and there emerges an interest in rechargeable secondary batteries among these electrochemical devices.

Among the currently used secondary batteries, lithium secondary batteries, developed in the early 1990's, are spotlighted because the lithium secondary batteries may have higher operating voltage and significantly higher energy density.

An ionic conductive non-aqueous electrolyte solution, in which a salt is dissolved in a non-aqueous organic solvent, has been mainly used in a conventional secondary battery.

However, the non-aqueous electrolyte solution is disadvantageous in that the possibilities of degrading an electrode material and volatizing the organic solvent are not only high, but safety is also low due to combustion caused by an increases in ambient temperature and temperature of the battery itself. In particular, it has limitations in that gas is generated in the battery due to the decomposition of a carbonate organic solvent and/or a side reaction between the organic solvent and an electrode during charge and discharge, and thus, a thickness of the battery increases.

Since a gel polymer electrolyte proposed to improve these disadvantages of the non-aqueous electrolyte solution has excellent electrochemical stability, the thickness of the battery may not only be constantly maintained, but a contact between the electrode and the electrolyte may also be excellent due to the inherent adhesion of a gel phase, and thus, the gel polymer electrolyte is being used in the preparation of a thin-film type battery.

As a method of preparing a secondary battery in which the gel polymer electrolyte is used, the following two methods are known.

First, a polymerizable monomer and a polymerization initiator are mixed with a non-aqueous organic solvent, in which a salt is dissolved, to prepare a composition for forming a gel, the composition is injected into a battery including an electrode assembly in which a positive electrode, a negative electrode, and a separator are wound or stacked, and gelation (crosslinking) may then be performed under appropriate temperature and time conditions to prepare a secondary battery containing a gel polymer electrolyte. However, the method is disadvantageous in that wetting and safety during a heating process for the gelation are low.

As another method, there is a method in which, after surfaces of the positive electrode, negative electrode, and separator are coated with a composition for a gel polymer electrolyte, gelation is performed by using heat or ultraviolet (UV) light, a battery is then prepared by combining them, and a conventional electrolyte solution is further injected thereinto. Since the method further includes the non-aqueous organic solvent, it is not satisfactory in terms of performance as well as thermal stability of the secondary battery.

Therefore, there is a need to develop a gel polymer electrolyte having improved performance such as wetting and high-temperature stability.

PRIOR ART DOCUMENT

Korean Patent Application Laid-open Publication No. 2015-0125928

DISCLOSURE OF THE INVENTION

Technical Problem

The present invention is provided to solve these problems.

An aspect of the present invention provides a composition for a gel polymer electrolyte having improved wetting and high-temperature safety.

Another aspect of the present invention provides a gel polymer electrolyte which is formed by polymerizing the composition for a gel polymer electrolyte.

Another aspect of the present invention provides a lithium secondary battery in which high-temperature safety is improved by including the gel polymer electrolyte.

Technical Solution

According to an aspect of the present invention, there is provided a composition for a gel polymer electrolyte including:
a lithium salt;
a non-aqueous organic solvent;
an oligomer represented by Formula 1; and
a polymerization initiator:

[Formula 1]

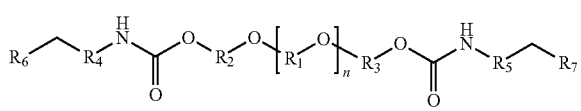

wherein, in Formula 1,
$R_1$ to $R_3$ are each independently a fluorine-substituted or unsubstituted alkylene group having 1 to 4 carbon atoms,
$R_4$ and $R_5$ are each independently an aliphatic hydrocarbon group or an aromatic hydrocarbon group,
$R_6$ and $R_7$ are each independently an alkyl group having 1 to 10 carbon atoms or

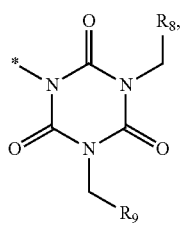

$R_8$ and $R_9$ are each independently an alkyl group having 1 to 10 carbon atoms or

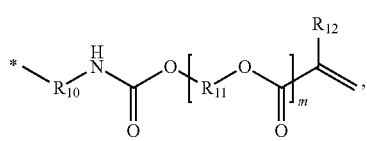

$R_{10}$ is an aliphatic hydrocarbon group or an aromatic hydrocarbon group, $R_{11}$ is an alkylene group having 1 to 3 carbon atoms, $R_{12}$ is hydrogen or an alkyl group having 1 to 2 carbon atoms, n is an integer of 1 to 70, and m is an integer of 1 to 3.

In the oligomer represented by Formula 1, the aliphatic hydrocarbon group may include an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Also, in the oligomer represented by Formula 1, the aromatic hydrocarbon group may include a substituted or unsubstituted arylene group having 6 to 20 carbon atoms; or a substituted or unsubstituted heteroarylene group having 2 to 20 carbon atoms.

Specifically, the oligomer represented by Formula 1 may include an oligomer represented by Formula 1a below.

[Formula 1a]

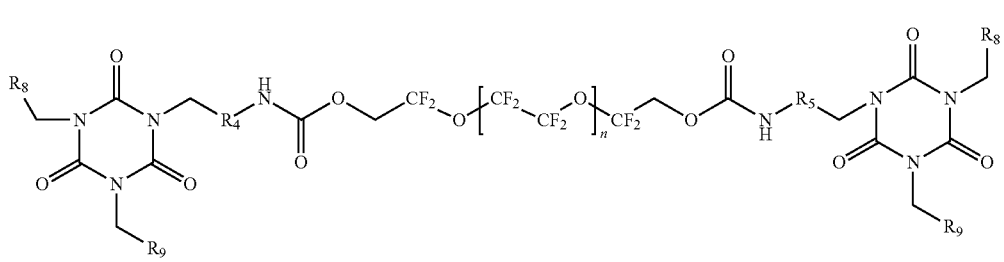

In Formula 1a, $R_4$ and $R_5$ are each independently an aliphatic hydrocarbon group, $R_8$ and $R_9$ are each independently

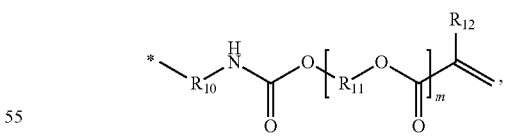

$R_{10}$ is an aliphatic hydrocarbon group, $R_{11}$ is an alkylene group having 1 to 3 carbon atoms, $R_{12}$ is hydrogen or an alkyl group having 1 to 2 carbon atoms, n is an integer of 10 to 20, and m is an integer of 1 to 2.

Specifically, the oligomer represented by Formula 1a may include an oligomer represented by Formula 1a-1 below.

[Formula 1a-1]

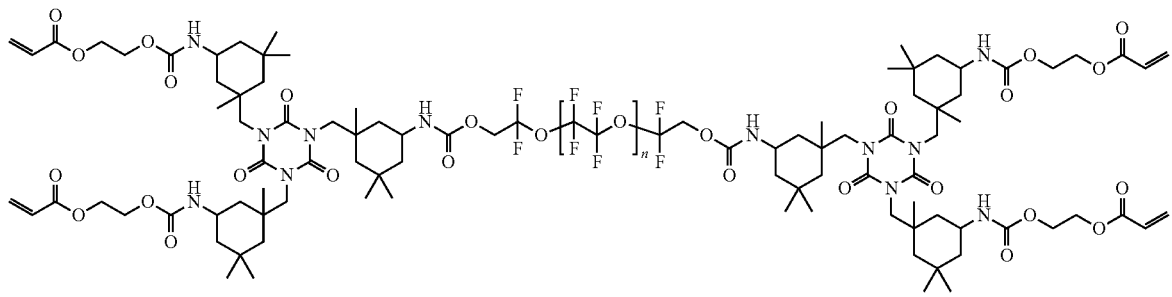

In Formula 1a-1,
n is an integer of 10 to 20.

The oligomer represented by Formula 1 may be included in an amount of 0.5 wt % to 20 wt %, for example, 0.5 wt % to 10 wt % based on a total weight of the composition for a gel polymer electrolyte.

Also, the oligomer represented by Formula 1 may have a weight-average molecular weight (Mw) of 1,000 g/mol to 10,000 g/mol, particularly 3,000 g/mol to 8,000 g/mol, and more particularly 3,000 g/mol to 5,000 g/mol.

According to another aspect of the present invention, there is provided a gel polymer electrolyte which is formed by polymerizing the composition for a gel polymer electrolyte in an inert atmosphere.

According to another aspect of the present invention, there is provided a lithium secondary battery including:
a negative electrode, a positive electrode, a separator disposed between the negative electrode and the positive electrode, and the gel polymer electrolyte of the present invention.

Advantageous Effects

According to an embodiment of the present invention, a composition for a gel polymer electrolyte having improved wetting may be prepared by including an oligomer having hydrophilic and hydrophobic functional groups. Also, a gel polymer electrolyte, which has low surface tension with a surface of an electrode and may prevent an electrolyte side reaction by forming a stable ionic conductive film on the surface of the electrode during initial charge, may be provided by using the composition. Furthermore, in the present invention, a lithium secondary battery, in which high-temperature stability is improved by including the gel polymer electrolyte, may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph showing the results of measurement of high-temperature safety of secondary batteries according to Experimental Example 1 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Unless otherwise specified in the present invention, the expression "*" denotes the same or different atom or a portion connected between ends of a formula.

In an embodiment of the present invention, provided is a composition for a gel polymer electrolyte which includes:
a non-aqueous organic solvent;
a lithium salt;
an oligomer represented by the following Formula 1; and
a polymerization initiator.

[Formula 1]

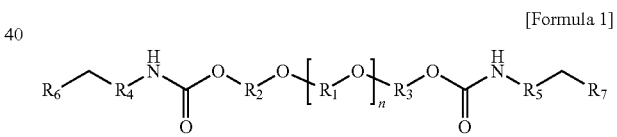

In Formula 1,
$R_1$ to $R_3$ are each independently a fluorine-substituted or unsubstituted alkylene group having 1 to 4 carbon atoms,
$R_4$ and $R_5$ are each independently an aliphatic hydrocarbon group or an aromatic hydrocarbon group,
$R_6$ and $R_7$ are each independently an alkyl group having 1 to 10 carbon atoms or

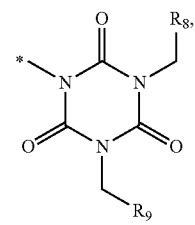

$R_8$ and $R_9$ are each independently an alkyl group having 1 to 10 carbon atoms or

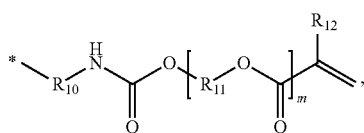

wherein $R_{10}$ is an aliphatic hydrocarbon group or an aromatic hydrocarbon group, $R_{11}$ is an alkylene group having 1 to 3 carbon atoms, $R_{12}$ is hydrogen or an alkyl group having 1 to 2 carbon atoms, n is an integer of 1 to 70, and m is an integer of 1 to 3.

In this case, in the oligomer represented by Formula 1, the aliphatic hydrocarbon group may include an alicyclic hydrocarbon group or a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Also, in the oligomer represented by Formula 1, the aromatic hydrocarbon group may include a substituted or unsubstituted arylene group having 6 to 20 carbon atoms; or a substituted or unsubstituted heteroarylene group having 2 to 20 carbon atoms.

Specifically, the oligomer represented by Formula 1 may include an oligomer represented by Formula 1a below.

[Formula 1a]

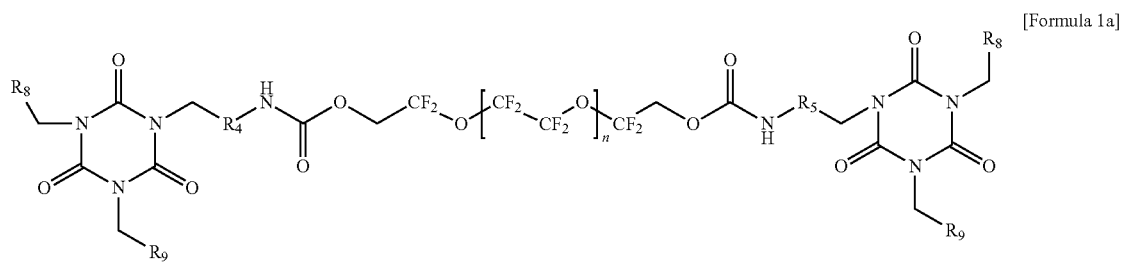

In Formula 1a, $R_4$ and $R_5$ are each independently an aliphatic hydrocarbon group, $R_8$ and $R_9$ are each independently

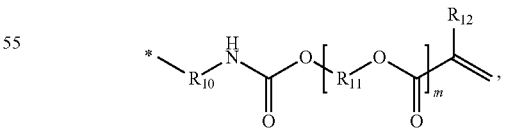

$R_{10}$ is an aliphatic hydrocarbon group, $R_{11}$ is an alkylene group having 1 to 3 carbon atoms, $R_{12}$ is hydrogen or an alkyl group having 1 to 2 carbon atoms, n is an integer of 10 to 20, and m is an integer of 1 to 2.

Specifically, the oligomer represented by Formula 1a may include an oligomer represented by Formula 1a-1 below.

[Formula 1a-1]

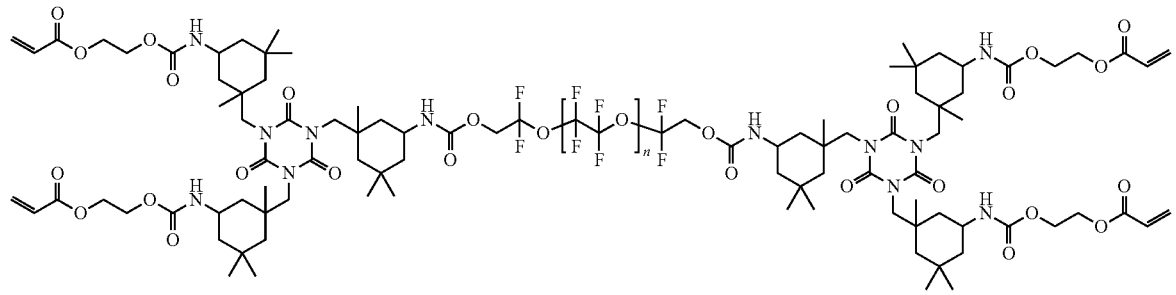

In Formula 1a-1,
n is an integer of 10 to 20.

In the composition for a gel polymer electrolyte of the present invention, since the oligomer represented by Formula 1 contains a fluorine-substituted ethylene group as a hydrophobic portion as well as an acrylate-based functional group as a hydrophilic portion capable of forming a cross-link at both ends by itself, it acts as a surfactant in the battery to be able to reduce surface resistance of an electrode interface. Therefore, the composition for a gel polymer electrolyte including the oligomer represented by Formula 1 may have a more improved wetting effect. In addition, since the oligomer represented by Formula 1 contains an amide group and a fluorine-substituted ethylene group having high electrochemical stability as a main chain unit in the structure, it may control a side reaction of lithium ions ($Li^+$) and a decomposition reaction of the lithium salt, and thus, the generation of gas, such as CO or $CO_2$, during overcharge may be reduced. A gel polymer electrolyte, which has low surface tension with a surface of an electrode as well as excellent thermal, chemical, oxidation stabilities and mechanical properties, may be provided by using the composition for a gel polymer electrolyte. The gel polymer electrolyte may prevent an electrolyte side reaction by forming a stable ionic conductive film on the surface of the electrode during initial charge. And, a lithium secondary battery, in which high-temperature safety is improved by including the gel polymer electrolyte, may be prepared.

According to an embodiment of the present invention, the oligomer represented by Formula 1 may be included in an amount of 0.5 wt % to 20 wt %, for example, 0.5 wt % to 10 wt % based on a total weight of the composition for a gel polymer electrolyte. If the amount of the oligomer is less than 0.5 wt %, a gel-forming effect in the entire electrolyte is insufficient, and, if the amount of the oligomer is greater than 20 wt %, since resistance is increased due to the excessive amount of the oligomer, ionic conductivity may be reduced.

Also, according to an embodiment of the present invention, a weight-average molecular weight (Mw) of the oligomer represented by Formula 1 may be controlled by the number of repeating units, and may be in a range of about 1,000 g/mol to about 10,000 g/mol, particularly 3,000 g/mol to 8,000 g/mol, and more particularly 3,000 g/mol to 5,000 g/mol.

In a case in which the weight-average molecular weight of the oligomer is within the above range, mechanical strength of the battery including the same may be effectively improved.

If the weight-average molecular weight of the oligomer is less than 1,000 g/mol, since the formation of a polymer matrix is difficult during a gel reaction, an effect of suppressing the electrolyte side reaction may be reduced. If the weight-average molecular weight of the oligomer is greater than 10,000 g/mol, since physical properties of the oligomer itself become rigid and an affinity to an electrolyte solvent is reduced, dissolution is not only difficult, but the wetting of the electrolyte in the initial battery is also significantly reduced due to high viscosity of the partially dissolved electrolyte, and thus, performance of the secondary battery may be degraded.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

Any lithium salt typically used in an electrolyte for a lithium secondary battery may be used as the lithium salt included in the composition for a gel polymer electrolyte according to the embodiment of the present invention without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. One or, if necessary, a mixture of two or more thereof may be used as the lithium salt. The lithium salt may be appropriately changed in a normally usable range, but may specifically be included in a concentration of 0.8 M to 2 M, for example, 0.8 M to 1.5 M in the composition for a gel polymer electrolyte to obtain an optimum effect of forming an anti-corrosion film on the surface of the electrode.

Also, the non-aqueous organic solvent included in the composition for a gel polymer electrolyte according to the embodiment of the present invention is not limited as long as it may minimize decomposition due to an oxidation reaction during charge and discharge of the secondary battery and may exhibit desired characteristics with an additive, and, for example, as the non-aqueous organic solvent, an ether-based solvent, an ester-based solvent, or an amide-based solvent may be used alone or in mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, δ-valerolactone, and ε-caprolactone, or a mixture of two or more thereof, but the present invention is not limited thereto.

Among the ester-based solvents, since the cyclic carbonate-based compound is well dissociate the lithium salt in the electrolyte due to high permittivity as a highly viscous organic solvent, the cyclic carbonate-based compound may be preferably used. Since a gel polymer electrolyte having high electrical conductivity may be prepared when the above cyclic carbonate-based compound is mixed with the low viscosity, low permittivity linear carbonate-based compound, such as dimethyl carbonate and diethyl carbonate, and the linear ester-based compound in an appropriate ratio, the mixed ester-based solvents may be more preferably used.

Furthermore, in the composition for a gel polymer electrolyte according to the embodiment of the present invention, a conventional polymerization initiator known in the art may be used as the polymerization initiator. For example, representative examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and at least one azo-based compound selected from the group consisting of 2,2'-azobis(2-cyanobutane), dimethyl 2,2'-azobis(2-methylpropionate), 2,2'-azobis(methylbutyronitrile), 2,2'-azobis(iso-butyronitrile) (AIBN), and 2,2'-azobisdimethyl-valeronitrile (AMVN), but the present invention is not limited thereto.

The polymerization initiator may form a radical by being decomposed by heat in the battery, for a non-limiting example, at a temperature of 30° C. to 100° C., for example, 60° C. to 80° C., or by being decomposed at room temperature (5° C. to 30° C.), and a polymerizable oligomer may be reacted by free radical polymerization to form a gel polymer electrolyte.

The polymerization initiator may be included in an amount of 0.1 part by weight to 5 parts by weight based on 100 parts by weight of the oligomer. In a case in which the amount of the polymerization initiator is greater than 5 parts by weight, the unreacted polymerization initiator may remain during the preparation of the gel polymer electrolyte to adversely affect battery performance. In contrast, if the amount of the polymerization initiator is less than 0.1 part by weight, gelation is not well performed even above a predetermined temperature.

The composition for a gel polymer electrolyte for a lithium secondary battery according to the embodiment of the present invention may further include an additional additive, if necessary. As the additional additive which may be used in the present invention, vinylene carbonate, vinyl ethylene carbonate, fluoroethylene carbonate, cyclic sulfite, saturated sultone, unsaturated sultone, and a non-cyclic sulfone may be used alone or in a mixture of two or more thereof.

In this case, the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, the saturated sultone may include 1,3-propane sultone and 1,4-butane sultone, the unsaturated sultone may include ethene sultone, 1,3-propene sultone, 1,4-butene sultone, and 1-methyl-1,3-propene sultone, and the non-cyclic sulfone may include divinyl sulfone, dimethyl sulfone, diethyl sulfone, methyl ethyl sulfone, and methyl vinyl sulfone.

The additional additives may be used as a mixture of two or more thereof, and may be included in an amount of 0.01 wt % to 5 wt %, particularly 0.01 wt % to 3 wt %, and more particularly 0.05 wt % to 3 wt % based on the total weight of the composition for a gel polymer electrolyte. If the amount of the additional additive is less than 0.01 wt %, effects of improving low-temperature output of the battery and improving high-temperature storage characteristics and high-temperature life characteristics are insignificant, and, if the amount of the additional additive is greater than 5 wt %, there is a possibility that the side reaction in the electrolyte excessively occurs during charge and discharge of the battery. In particular, since the additional additives are not sufficiently decomposed at high temperature when the additives for forming a solid electrolyte interface (SEI) are excessively added, the additional additives may be present as unreacted materials or precipitates in the electrolyte solution at room temperature. Accordingly, a side reaction may occur in which lifetime or resistance characteristics of the secondary battery are reduced.

Also, in an embodiment of the present invention, provided is a gel polymer electrolyte which is formed by polymerizing the composition for a gel polymer electrolyte in an inert atmosphere.

Furthermore, in an embodiment of the present invention, provided is a lithium secondary battery including a negative electrode, a positive electrode, a separator disposed between the negative electrode and the positive electrode, and the gel polymer electrolyte of the present invention.

Specifically, after injecting the composition for a gel polymer electrolyte into the secondary battery, the gel polymer electrolyte may be prepared by performing a curing reaction.

For example, the gel polymer electrolyte may be formed by in-situ polymerization of the composition for a gel polymer electrolyte in the secondary battery.

According to an exemplary embodiment of the present invention, (a) inserting an electrode assembly composed of a positive electrode, a negative electrode, and a separator disposed between the positive electrode and the negative electrode into a battery case, and (b) injecting the composition for a gel polymer electrolyte according to the present invention into the battery case and polymerizing the composition to form a gel polymer electrolyte may be included.

An in-situ polymerization reaction in the lithium secondary battery may be performed by using electron beam (E-beam), γ-ray, and room temperature or high temperature aging processes, and, according to an embodiment of the present invention, the in-situ polymerization reaction may be performed by thermal polymerization. In this case, polymerization time required may be in a range of about 2 minutes to about 12 hours, and thermal polymerization temperature may be in a range of 60° C. to 100° C., for example, 60° C. to 80° C.

Specifically, in the in-situ polymerization reaction in the lithium secondary battery, predetermined amounts of the polymerization initiator and the oligomer are added to the composition for a gel polymer electrolyte containing a lithium salt and mixed, and the mixture is then injected into a battery cell. When an electrolyte injection hole of the battery cell is sealed and, for example, polymerization is then performed by heating the battery cell to 60° C. to 80° C. for 1 hour to 20 hours, a gel polymer electrolyte is prepared while the lithium salt-containing composition for a gel polymer electrolyte is gelated.

The lithium secondary battery according to the embodiment of the present invention has a charge voltage ranging from 3.0 V to 5.0 V, and thus, capacity characteristics of the lithium secondary battery may be excellent in both normal and high voltage ranges.

Also, in a case in which a coating type gel polymer electrolyte is achieved by using the gel polymer electrolyte of the present invention, inorganic particles may be further included in an amount of 10 wt % to 25 wt % based on a total weight of the gel polymer electrolyte.

The inorganic particles are impregnated in a polymer network and thus, may allow a high-viscosity solvent to be well permeated through pores which are formed by spaces between the inorganic particles. That is, since the inorganic particles are included, an effect of further improving wettability to the high-viscosity solvent due to affinity between polar materials and a capillary phenomenon may be obtained.

Inorganic particles, in which permittivity is high and an oxidation and/or reduction reaction does not occur in an operating voltage range (for example, 0 to 5 V based on Li/Li$^+$) of the lithium secondary battery, may be used as the above inorganic particles.

Specifically, typical examples of the inorganic particles may be a single material selected from the group consisting of BaTiO$_3$ having a dielectric constant of 5 or more, BaTiO$_3$, Pb(Zr,Ti)O$_3$ (PZT), Pb$_{1-a}$La$_a$Zr$_{1-b}$Ti$_b$O$_3$ (PLZT, where 0<a<1, 0<b<1), Pb(Mg$_{1/3}$Nb$_{2/3}$)O$_3$—PbTiO$_3$ (PMN-PT), hafnia (HfO$_2$), SrTiO$_3$, SnO$_2$, CeO$_2$, MgO, NiO, CaO, ZnO, ZrO$_2$, Y$_2$O$_3$, Al$_2$O$_3$, TiO$_2$, SiC, and a mixture thereof, or a mixture of two or more thereof.

Also, in addition to the above inorganic particles, inorganic particles having lithium ion transfer ability, that is, lithium phosphate (Li$_3$PO$_4$), lithium titanium phosphate (Li$_c$Ti$_d$(PO$_4$)$_3$, 0<c<2, 0<d<3), lithium aluminum titanium phosphate (Li$_{a1}$Al$_{b1}$Ti$_{c1}$(PO$_4$)$_3$, 0<a1<2, 0<b1<1, 0<c1<3), (LiAlTiP)$_{a2}$O$_{b2}$-based glass (0<a2<4, 0<b2<13) such as 14Li$_2$O-9Al$_2$O$_3$-38TiO$_2$-39P$_2$O$_5$, lithium lanthanum titanate (Li$_{a3}$La$_{b3}$TiO$_3$, 0<a3<2, 0<b3<3), lithium germanium thiophosphate (Li$_{a4}$Ge$_{b4}$P$_{c2}$S$_d$, 0<a4<4, 0<b4<1, 0<c2<1, 0<d<5) such as Li$_{3.25}$Ge$_{0.25}$P$_{0.75}$S$_4$, lithium nitride (Li$_{a5}$N$_{b5}$, 0<a5<4, 0<b5<2) such as Li$_3$N, SiS$_2$-based glass (Li$_{a6}$Si$_{b6}$S$_{c3}$, 0<a6<3, 0<b6<2, 0<c3<4) such as Li$_3$PO$_4$—Li$_2$S—SiS$_2$, P$_2$S$_5$-based glass (Li$_{a7}$P$_{b7}$S$_{c5}$, 0<a7<3, 0<b7<3, 0<c5<7), such as LiI—Li$_2$S—P$_2$S$_5$, or a mixture thereof may be further included.

An average particle diameter of the inorganic particles may be in a range of about 0.001 μm to about 10 μm so as to provide adequate porosity with uniform thickness in the gel polymer electrolyte. In a case in which the average particle diameter is less than 0.001 μm, dispersibility may be reduced. In a case in which the average particle diameter is greater than 10 μm, the thickness of a porous coating layer may not only be increased, but a phenomenon may also occur in which the inorganic particles are agglomerated. Thus, mechanical strength may be reduced while the inorganic particles are exposed to the outside of the gel polymer electrolyte.

The lithium secondary battery of the present invention may be prepared by injecting the composition for a gel polymer electrolyte of the present invention into an electrode assembly, which is composed of the positive electrode, the negative electrode, and the separator disposed between the positive electrode and the negative electrode, and then performing gelation. In this case, those typically used in the preparation of the lithium secondary battery may all be used as the positive electrode, the negative electrode, and the separator which constitute the electrode assembly.

The positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., LiMnO$_2$, LiMn$_2$O$_4$, etc.), lithium-cobalt-based oxide (e.g., LiCoO$_2$, etc.), lithium-nickel-based oxide (e.g., LiNiO$_2$, etc.), lithium-nickel-manganese-based oxide (e.g., LiNi$_{1-Y}$Mn$_Y$O$_2$ (where 0<Y<1), LiMn$_{2-Z}$Ni$_Z$O$_4$ (where 0<Z<2), etc.), lithium-nickel-cobalt-based oxide (e.g., LiNi$_{1-Y1}$Co$_{Y1}$O$_2$ (where 0<Y1<1), lithium-manganese-cobalt-based oxide (e.g., LiCo$_{1-Y2}$Mn$_{Y2}$O$_2$ (where 0<Y2<1), LiMn$_{2-Z1}$Co$_{Z1}$O$_4$ (where 0<Z1<2), etc.), lithium-nickel-manganese-cobalt-based oxide (e.g., Li(Ni$_p$Co$_q$Mn$_{r1}$)O$_2$ (where 0<p<1, 0<q<1, 0<r1<1, and p+q+r1=1) or Li(Ni$_{p1}$Co$_{q1}$Mn$_{r2}$)O$_4$ (where 0<p1<2, 0<q1<2, 0<r2<2, and p1+q1+r2=2), etc.), or lithium-nickel-cobalt-transition metal (M) oxide (e.g., Li(Ni$_{p2}$CO$_{q2}$Mn$_{r3}$M$_{s2}$)O$_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$ etc.).

The positive electrode active material may be included in an amount of 80 wt % to 99.5 wt %, for example, 85 wt % to 95 wt % based on a total weight of solid content in the positive electrode slurry.

In a case in which the amount of the positive electrode active material is 80 wt % or less, since energy density is decreased, capacity may be reduced.

The binder is a component that assists in the binding between the active material and the conductive agent and in the binding with the current collector, wherein the binder is commonly added in an amount of 1 wt % to 30 wt % based on the total weight of the solid content in the positive electrode slurry. Specifically, the binder is added in an amount of 1 part by weight to 50 parts by weight, for example, 3 parts by weight to 15 parts by weight, based on the total weight of the solid content in the positive electrode slurry. If the amount of the binder is less than 1 part by weight, adhesion between the electrode active material and the current collector may be insufficient, and if the amount of the binder is greater than 50 parts by weight, the adhesion may be improved, but, since the amount of the electrode active material is relatively reduced, battery capacity may be lowered.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Furthermore, the conductive agent is a material providing conductivity while not causing chemical changes in the battery, wherein the conductive agent may be added in an amount of 1 wt % to 20 wt % based on the total weight of the solid content in the positive electrode slurry.

As typical examples of the conductive agent, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used, and those currently sold under the names, such as acetylene black-based conductive agents (Chevron Chemical Company, Denka black (Denka Singapore Private Limited), or Gulf Oil Company), Ketjen black, ethylene carbonate (EC)-based conductive agents (Armak Company), Vulcan XC-72 (Cabot Company), and Super P (Timcal Graphite & Carbon), may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 60 wt %, for example, 20 wt % to 50 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 µm to 500 µm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0\leq x\leq 1$), $Li_xWO_2$ ($0\leq x\leq 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; 0<x≤1; 1≤y≤3; 1≤z≤8) may be used as the metal composite oxide.

The material, which may be doped and undoped with lithium, may include Si, $SiO_x$ (0<x<2), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The same material as that used in the preparation of the positive electrode may be used as the conductive agent, wherein the conductive agent may be added in an amount of 1 wt % to 20 wt % based on the total weight of the solid content in the negative electrode slurry.

The solvent may include water or an organic solvent, such as N-methyl-2-pyrrolidone (NMP) and alcohol, and may be used in an amount such that desirable viscosity is obtained when the negative electrode active material as well as selectively the binder and the conductive agent are included. For example, the solvent may be included in an amount such that a concentration of the solid content including the negative electrode active material as well as selectively the binder and the conductive agent is in a range of 50 wt % to 95 wt %, for example, 70 wt % to 90 wt %.

Also, a typical porous polymer film used as a typical separator, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

<Preparation of Lithium Secondary Battery>

Example 1

(Preparation of Composition for Gel Polymer Electrolyte)

A composition for a gel polymer electrolyte was prepared by adding 5 g of the compound of Formula 1a-1 (n=10, weight-average molecular weight (Mw): 3,000 g/mol) and 0.2 g of dimethyl 2,2'-azobis(2-methylpropionate) (CAS No. 2589-57-3), as a polymerization initiator, to 94.8 g of a non-aqueous organic solvent (ethylene carbonate (EC):ethyl methyl carbonate (EMC)=volume ratio of 3:7) in which 1 M $LiPF_6$ was dissolved.

(Lithium Secondary Battery Preparation)

94 wt % of $LiN_{1/3}Co_{1/3}Mn_{1/3}O_2$(NCM) as a positive electrode active material, 3 wt % of carbon black as a conductive agent, and 3 wt % of polyvinylidene fluoride, as a binder, were added to N-methyl-2-pyrrolidone (NMP), as a solvent, to prepare a positive electrode active material slurry (solid concentration of 50%). An about 20 μm thick aluminum (Al) thin film, as a positive electrode collector, was coated with the positive electrode active material slurry and dried, and the coated Al thin film was then roll-pressed to prepare a positive electrode.

96 wt % of carbon powder as a negative electrode active material, 3 wt % of polyvinylidene fluoride (PVDF) as a binder, and 1 wt % of carbon black, as a conductive agent, were added to NMP, as a solvent, to prepare a negative electrode active material slurry (solid concentration of 80%) A 10 μm thick copper (Cu) thin film, as a negative electrode collector, was coated with the negative electrode active material slurry and dried, and the coated Cu thin film was then roll-pressed to prepare a negative electrode.

An electrode assembly was prepared by sequentially stacking the positive electrode, a separator formed of three layers of polypropylene/polyethylene/polypropylene (PP/PE/PP) and the negative electrode, the electrode assembly was put in a battery case, and the prepared composition for a gel polymer electrolyte was injected thereinto.

Subsequently, after storing the battery case at room temperature for 2 days, the battery case was heated at 65° C. for 5 hours to prepare a lithium secondary battery including a thermally polymerized gel polymer electrolyte.

Example 2

A composition for a gel polymer electrolyte and a secondary battery, which includes a gel polymer electrolyte using the same, were prepared in the same manner as in Example 1 except that 10 g of the compound of Formula 1a-1 and 0.2 g of the polymerization initiator were added to 89.8 g of the non-aqueous organic solvent during the preparation of the composition for a gel polymer electrolyte.

Example 3

A composition for a gel polymer electrolyte and a secondary battery, which includes a gel polymer electrolyte using the same, were prepared in the same manner as in Example 1 except that 1 g of the compound of Formula 1a-1 and 0.02 g of the polymerization initiator were added to 98.98 g of the non-aqueous organic solvent during the preparation of the composition for a gel polymer electrolyte.

Example 4

A composition for a gel polymer electrolyte and a secondary battery, which includes a gel polymer electrolyte using the same, were prepared in the same manner as in Example 1 except that 5 g of the compound of Formula 1a-1 (weight-average molecular weight (Mw): 1,000 g/mol) and 0.2 g of the polymerization initiator were added to 94.8 g of the non-aqueous organic solvent during the preparation of the composition for a gel polymer electrolyte.

Example 5

A composition for a gel polymer electrolyte and a secondary battery, which includes a gel polymer electrolyte using the same, were prepared in the same manner as in Example 1 except that 20 g of the compound of Formula 1a-1 and 2 g of the polymerization initiator were added to 78 g of the non-aqueous organic solvent during the preparation of the composition for a gel polymer electrolyte.

Example 6

A composition for a gel polymer electrolyte and a secondary battery, which includes a gel polymer electrolyte using the same, were prepared in the same manner as in Example 1 except that 5 g of the compound of Formula 1a-1 (weight-average molecular weight (Mw): 10,000 g/mol) and 0.2 g of the polymerization initiator were added to 94.8 g of the non-aqueous organic solvent during the preparation of the composition for a gel polymer electrolyte.

Example 7

A composition for a gel polymer electrolyte and a secondary battery, which includes a gel polymer electrolyte using the same, were prepared in the same manner as in Example 1 except that 0.3 g of the compound of Formula 1a-1 (n=10, weight-average molecular weight (Mw): 3,000 g/mol) and 0.02 g of the polymerization initiator were added to 99.68 g of the non-aqueous organic solvent during the preparation of the composition for a gel polymer electrolyte.

Example 8

A composition for a gel polymer electrolyte and a secondary battery, which includes a gel polymer electrolyte using the same, were prepared in the same manner as in Example 1 except that 25 g of the compound of Formula 1a-1 (n=10, weight-average molecular weight (Mw): 3,000 g/mol) and 5 g of the polymerization initiator were added to 70 g of the non-aqueous organic solvent during the preparation of the composition for a gel polymer electrolyte.

Example 9

A composition for a gel polymer electrolyte and a secondary battery, which includes a gel polymer electrolyte using the same, were prepared in the same manner as in Example 1 except that 5 g of the compound of Formula 1a-1 (n=10, weight-average molecular weight (Mw): 500 g/mol) and 0.2 g of the polymerization initiator were added to 94.8 g of the non-aqueous organic solvent during the preparation of the composition for a gel polymer electrolyte.

Example 10

A composition for a gel polymer electrolyte and a secondary battery, which includes a gel polymer electrolyte using the same, were prepared in the same manner as in Example 1 except that 5 g of the compound of Formula 1a-1 (n=10, weight-average molecular weight (Mw): 20,000 g/mol) and 0.2 g of the polymerization initiator were added to 94.8 g of the non-aqueous organic solvent during the preparation of the composition for a gel polymer electrolyte.

Comparative Example 1

(Non-aqueous Electrolyte Solution Preparation)

A non-aqueous electrolyte solution was prepared by dissolving 1 M $LiPF_6$ in a non-aqueous organic solvent (ethylene carbonate (EC):ethyl methyl carbonate (EMC)=volume ratio of 3:7).

(Lithium Secondary Battery Preparation)

94 wt % of $LiNi_{1/3}Co_{1/3}Mn_{1/3}O_2$(NCM) as a positive electrode active material, 3 wt % of carbon black as a conductive agent, and 3 wt % of polyvinylidene fluoride, as a binder, were added to N-methyl-2-pyrrolidone (NMP), as a solvent, to prepare a positive electrode active material slurry (solid concentration of 50%). An about 20 μm thick aluminum (Al) thin film, as a positive electrode collector, was coated with the positive electrode active material slurry and dried, and the coated Al thin film was then roll-pressed to prepare a positive electrode.

96 wt % of carbon powder as a negative electrode active material, 3 wt % of polyvinylidene fluoride (PVDF) as a binder, and 1 wt % of carbon black, as a conductive agent, were added to NMP, as a solvent, to prepare a negative electrode active material slurry (solid concentration of 80%). A 10 μm thick copper (Cu) thin film, as a negative electrode collector, was coated with the negative electrode active material slurry and dried, and the coated Cu thin film was then roll-pressed to prepare a negative electrode.

An electrode assembly was prepared by sequentially stacking the positive electrode, a separator formed of three layers of polypropylene/polyethylene/polypropylene (PP/PE/PP), and the negative electrode.

After the electrode assembly was prepared by using the positive electrode, a separator formed of three layers of polypropylene/polyethylene/polypropylene (PP/PE/PP), and the negative electrode, the electrode assembly was put in a battery case, and the prepared non-aqueous electrolyte solution was injected thereinto to prepare a lithium secondary battery (full cell).

Comparative Example 2

(Preparation of Composition for Gel Polymer Electrolyte)

A composition for a gel polymer electrolyte was prepared by adding 5 g of ethoxylated tri-methylolpropane triacrylate (ETPTA) oligomer represented by the following Formula 3 and 0.2 g of dimethyl 2,2'-azobis(2-methylpropionate) (CAS No. 2589-57-3), as a polymerization initiator, to 95 g of a non-aqueous organic solvent (ethylene carbonate (EC):ethyl methyl carbonate (EMC)=volume ratio of 3:7) in which 1 M LiPF$_6$ was dissolved.

[Formula 3]

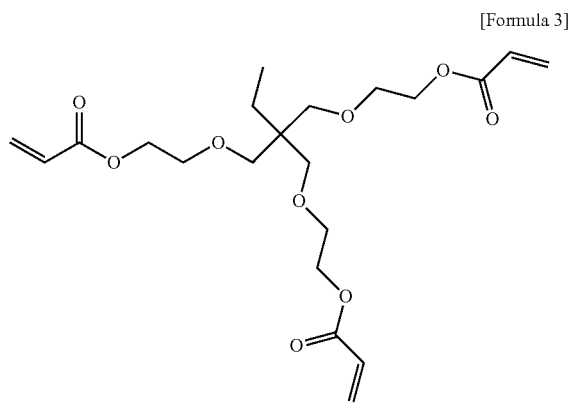

(Lithium Secondary Battery Preparation)

A lithium secondary battery including a gel polymer electrolyte was prepared in the same manner as in Example 1 except that the above-prepared composition for a gel polymer electrolyte was used.

Configurations of the compositions for a gel polymer electrolyte of Example 1 to 10 and the compositions for a gel polymer electrolyte of Comparative Examples 1 and 2 are summarized in Table 1 below.

EXPERIMENTAL EXAMPLES

Experimental Example 1

High-temperature Stability Evaluation (1)

The lithium secondary batteries including the gel polymer electrolytes of Examples 1 and 2, the lithium secondary battery including the non-aqueous electrolyte solution of Comparative Example 1, and the lithium secondary battery including the gel polymer electrolyte of Comparative Example 2 were respectively stored at high temperature (60° C.) at a state of charge (SOC) of 100%, and a thickness increase rate (%) was then measured. The results thereof are presented in FIG. 1.

Referring to the thickness increase rates (%) in FIG. 1, with respect to the secondary batteries of Examples 1 and 2 in which the compositions for a gel polymer electrolyte including the oligomer according to the embodiment of the present invention were used, it may be confirmed that the thickness increase rates were significantly reduced after 4 weeks at 60° C. in comparison to those of the secondary battery of Comparative Example 1, in which the electrolyte solution not including the oligomer was used, and the secondary battery of Comparative Example 2 in which the composition for a gel polymer electrolyte was used.

Experimental Example 2

High-temperature Stability Evaluation (2)

The lithium secondary batteries prepared in Examples 3 to 10 were charged at a 0.1 C rate for 3 hours. Subsequently,

TABLE 1

| | Composition for a gel polymer electrolyte | | | | | |
|---|---|---|---|---|---|---|
| | Non-aqueous organic solvent | | | Oligomer | | Amount of polymeriza- tion initiator added (g) |
| | Type | Amount added (g) | Formula | Molecular weight (g/mol) | Amount added (g) | |
| Example 1 | EC:EMC = 3:7 volume ratio | 94.8 | 1a-1 | 3,000 | 5 | 0.2 |
| Example 2 | EC:EMC = 3:7 volume ratio | 89.8 | 1a-1 | 3,000 | 10 | 0.2 |
| Example 3 | EC:EMC = 3:7 volume ratio | 98.98 | 1a-1 | 3,000 | 1 | 0.02 |
| Example 4 | EC:EMC = 3:7 volume ratio | 94.8 | 1a-1 | 1,000 | 5 | 0.2 |
| Example 5 | EC:EMC = 3:7 volume ratio | 78 | 1a-1 | 3,000 | 20 | 2 |
| Example 6 | EC:EMC = 3:7 volume ratio | 94.8 | 1a-1 | 10,000 | 5 | 0.2 |
| Example 7 | EC:EMC = 3:7 volume ratio | 99.68 | 1a-1 | 3,000 | 0.3 | 0.02 |
| Example 8 | EC:EMC = 3:7 volume ratio | 70 | 1a-1 | 3,000 | 25 | 5 |
| Example 9 | EC:EMC = 3:7 volume ratio | 94.8 | 1a-1 | 500 | 5 | 0.2 |
| Example 10 | EC:EMC = 3:7 volume ratio | 94.8 | 1a-1 | 20,000 | 5 | 0.2 |
| Comparative Example 1 | EC:EMC = 3:7 volume ratio | 100 | — | — | — | — |
| Comparative Example 2 | EC:EMC = 3:7 volume ratio | 94.8 | 3 | 3,000 | 5 | 0.2 | the lithium secondary batteries were degassed/resealed, charged at 0.2 C to 4.15 V under a constant current/constant voltage condition at room temperature, and discharged at 0.2 C to 3.0 V under a constant current condition to perform initial charge and discharge. After the initial charge and discharge, each battery was charged to 4.15 V, and capacity retention (%) and thickness increase rate (swelling) of each cell at 6 weeks compared to 0 week were measured while being stored at 60° C. for 6 weeks (SOC of 100%).

The results thereof are presented in Table 2 below.

TABLE 2

| | Capacity retention (%) | Thickness increase rate (%) |
|---|---|---|
| Example 3 | 97.2% | 7.5% |
| Example 4 | 94.0% | 6.3% |
| Example 5 | 94.7% | 6.7% |
| Example 6 | 95.1% | 6.6% |
| Example 7 | — | — |
| Example 8 | 90.1% | 15.9% |
| Example 9 | 91% | 10.8% |
| Example 10 | 87.7% | 20.4% |

As illustrated in Table 2, it may be understood that the lithium secondary batteries prepared in Examples 3 to 6 had a capacity retention after high-temperature storage of about 94% or more and a thickness increase rate after high-temperature storage of about 7.5% or less.

Since the gelation of the lithium secondary battery of Example 7, which included the composition for a gel polymer electrolyte including a small amount of the oligomer, was difficult, performance test was not possible.

Also, the lithium secondary battery of Example 8, which included the gel polymer electrolyte including an excessive amount of the oligomer, had a capacity retention after high-temperature storage of 90.1% or more due to an increase in resistance in the electrolyte and a thickness increase rate after high-temperature storage of 15.9%, wherein it may be understood that the capacity retention and thickness increase rate were deteriorated in comparison to the lithium secondary batteries prepared in Examples 3 to 6.

Furthermore, the lithium secondary battery of Example 9, which included the gel polymer electrolyte including the oligomer having a low weight-average molecular weight, had a capacity retention after high-temperature storage of 91% or more and a thickness increase rate after high-temperature storage of 10.8%, wherein it may be understood that the capacity retention and thickness increase rate were deteriorated in comparison to the lithium secondary batteries prepared in Examples 3 to 6 due to the deterioration of the gel polymer reaction under the same conditions.

Also, with respect to the lithium secondary battery of Example 10 which included the gel polymer electrolyte including the oligomer having a high weight-average molecular weight, since a wetting effect was reduced due to an increase in viscosity of the composition for a gel polymer electrolyte, it may be understood that the capacity retention and thickness increase rate were deteriorated in comparison to the lithium secondary batteries prepared in Examples 3 to 6.

The invention claimed is:
1. A composition for a gel polymer electrolyte, the composition comprising:
a lithium salt;
a non-aqueous organic solvent;
an oligomer represented by Formula 1; and
a polymerization initiator:

[Formula 1]

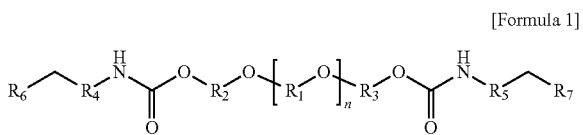

wherein, in Formula 1,
$R_1$ to $R_3$ are each independently a fluorine-substituted or unsubstituted alkylene group having 1 to 4 carbon atoms,
$R_4$ and $R_5$ are each independently an aliphatic hydrocarbon group or an aromatic hydrocarbon group,
$R_6$ and $R_7$ are each independently an alkyl group having 1 to 10 carbon atoms or

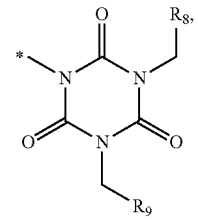

$R_8$ and $R_9$ are each independently an alkyl group having 1 to 10 carbon atoms or

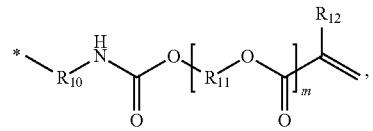

wherein $R_{10}$ is an aliphatic hydrocarbon group or an aromatic hydrocarbon group,
$R_{11}$ is an alkylene group having 1 to 3 carbon atoms,
$R_{12}$ is hydrogen or an alkyl group having 1 to 2 carbon atoms,
n is an integer of 1 to 70, and
m is an integer of 1 to 3,
wherein, in the oligomer represented by Formula 1,
the aliphatic hydrocarbon group comprises at least one alicyclic hydrocarbon group or at least one linear hydrocarbon group,
wherein the alicyclic hydrogen group is selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms,
wherein the linear hydrocarbon group is selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms, and the aromatic hydrocarbon group comprises a substituted or unsubstituted arylene group having 6 to 20 carbon atoms; or a substituted or unsubstituted heteroarylene group having 2 to 20 carbon atoms.

2. The composition for a gel polymer electrolyte of claim 1, wherein the oligomer represented by Formula 1 comprises an oligomer represented by Formula 1a:

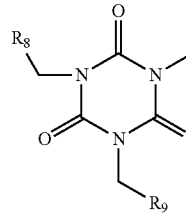
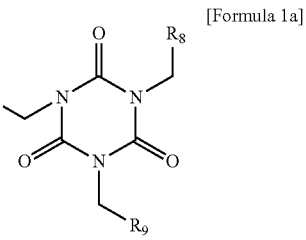

[Formula 1a]

wherein, in Formula 1a, $R_4$ and $R_5$ are each independently an aliphatic hydrocarbon group, $R_8$ and $R_9$ are each independently

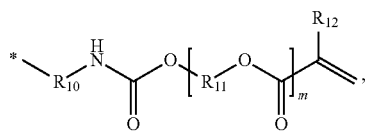

$R_{10}$ is an aliphatic hydrocarbon group,
$R_{11}$ is an alkylene group having 1 to 3 carbon atoms,
$R_{12}$ is hydrogen or an alkyl group having 1 to 2 carbon atoms,
n is an integer of 10 to 20, and
m is an integer of 1 to 2.

3. The composition for a gel polymer electrolyte of claim 2, wherein the oligomer represented by Formula 1a comprises an oligomer represented by Formula 1a-1:

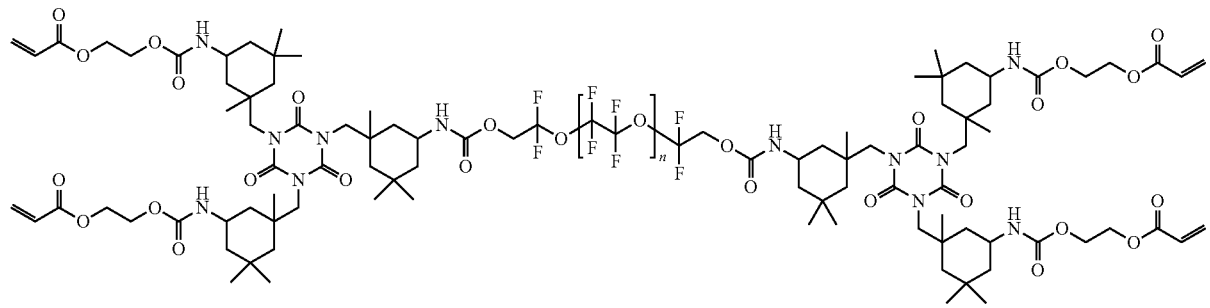

[Formula 1a-1]

wherein, in Formula 1a-1, n is an integer of 10 to 20.

4. The composition for a gel polymer electrolyte of claim 1, wherein the oligomer represented by Formula 1 is included in an amount of 0.5 wt % to 20 wt % based on a total weight of the composition for a gel polymer electrolyte.

5. The composition for a gel polymer electrolyte of claim 4, wherein the oligomer represented by Formula 1 is included in an amount of 0.5 wt % to 10 wt % based on the total weight of the composition for a gel polymer electrolyte.

6. The composition for a gel polymer electrolyte of claim 1, wherein the oligomer represented by Formula 1 has a weight-average molecular weight (Mw) of 1,000 g/mol to 10,000 g/mol.

7. The composition for a gel polymer electrolyte of claim 6, wherein the oligomer represented by Formula 1 has a weight-average molecular weight (Mw) of 3,000 g/mol to 8,000 g/mol.

8. The composition for a gel polymer electrolyte of claim 7, wherein the oligomer represented by Formula 1 has a weight-average molecular weight (Mw) of 3,000 g/mol to 5,000 g/mol.

9. A gel polymer electrolyte which is formed by injecting the composition for a gel polymer electrolyte of claim 1 into a battery in an inert atmosphere and performing polymerization.

10. A lithium secondary battery comprising a negative electrode, a positive electrode, a separator disposed between the negative electrode and the positive electrode, and the gel polymer electrolyte of claim 9

\* \* \* \* \*